United States Patent [19]

Cliffe

[11] Patent Number: 4,528,232
[45] Date of Patent: Jul. 9, 1985

[54] WINDSCREEN ACCESSORY

[75] Inventor: Nicholas R. Cliffe, Marple, England

[73] Assignee: Fade-In Products Limited, Cheshire, England

[21] Appl. No.: 483,116

[22] Filed: Apr. 8, 1983

[30] Foreign Application Priority Data

Apr. 14, 1982 [GB] United Kingdom ............... 8210832

[51] Int. Cl.³ ................................................ B60J 3/00
[52] U.S. Cl. ..................................... 428/195; 40/593;
296/97 R; 350/276 R; 427/284; 428/31;
428/187
[58] Field of Search ............... 428/31, 194, 187, 195;
296/97 A, 97 C, 97 F, 97 R; 350/276 R, 276 L,
314, 322; 427/284

[56] References Cited

U.S. PATENT DOCUMENTS

| 757,549 | 4/1904 | Gould | 428/181 X |
|---|---|---|---|
| 1,910,503 | 5/1933 | Schollmeyer | 296/97 C |
| 2,987,103 | 6/1961 | Yakubik | 428/203 |
| 3,046,686 | 7/1962 | Fogle | 428/13 |
| 3,199,114 | 2/1963 | Malifaud | 296/97 F X |
| 3,301,794 | 5/1962 | Zalkind | 428/46 X |
| 3,445,135 | 11/1966 | Masi | 296/97 F |
| 3,511,365 | 5/1970 | Dow | 428/31 X |
| 3,512,880 | 5/1970 | Alexander et al. | 350/276 R |
| 3,725,184 | 4/1973 | Scopp | 428/203 |
| 3,868,293 | 2/1975 | Selph | 296/97 F X |
| 4,090,464 | 5/1978 | Bishopp et al. | 428/40 X |
| 4,129,671 | 12/1978 | Greenberg | 428/48 |
| 4,138,284 | 2/1979 | Postupack | 156/100 |
| 4,225,652 | 9/1980 | Mercer et al. | 428/519 X |
| 4,232,078 | 11/1980 | Kamada | 428/195 |
| 4,302,263 | 11/1981 | Postupack | 156/100 |
| 4,358,488 | 11/1982 | Dunklin et al. | 428/31 |

FOREIGN PATENT DOCUMENTS

| 592177 | 7/1944 | United Kingdom . |
|---|---|---|
| 729756 | 7/1950 | United Kingdom . |
| 729733 | 7/1950 | United Kingdom . |
| 729755 | 10/1950 | United Kingdom . |
| 780778 | 5/1956 | United Kingdom . |
| 778817 | 7/1957 | United Kingdom . |
| 1045160 | 2/1963 | United Kingdom . |
| 1145463 | 6/1967 | United Kingdom . |
| 1272007 | 10/1969 | United Kingdom . |

Primary Examiner—Henry F. Epstein
Attorney, Agent, or Firm—Oblon, Fisher, Spivak, McClelland & Maier

[57] ABSTRACT

A strip of film for application to the upper edge of a windscreen or otherwise to act as an anti-glare device is characterized in that the degree of transparency thereof increases gradually from the upper to the lower edge thereof. The strip may be made by screen printing using a half-tone process and may be made in different colors using different kinds of ink.

20 Claims, 2 Drawing Figures

WINDSCREEN ACCESSORY

BACKGROUND OF THE INVENTION

This invention concerns an accessory for the windscreen of a vehicle, particularly, though by no means exclusively a motor car, or for other glass in a motor vehicle or elsewhere.

Many relatively costly cars are provided with a windscreen having a self-tinted strip along its upper edge which becomes progressively lighter with distance from the extreme upper edge thereof. Such acts as an anti-glare device rendering use of conventional sun-visors unnecessary in all but extreme conditions. For some years inexpensive strips of windscreen cling-film have been available as an easily added accessory for more humble vehicles. Such strips, whilst often incorporating a name or slogan, have always otherwise been of uniform density of colour throughout, with the disadvantage that the transition between the clear (or uniformly tinted) main body of the windscreen and the lower edge of the strip is very marked and abrupt.

SUMMARY OF THE INVENTION

It is an object of the present invention to provide a strip of film for application to a windscreen or otherwise to act as an anti-glare device, which overcomes the disadvantage aforesaid.

According to the present invention there is provided a strip of film for application to the upper edge of a windscreen or otherwise to act as an anti-glare device characterised in that the degree of transparency thereof increases gradually from the upper to the lower edge thereof.

The strip may be of clear film which has been treated with an opacifier, such as by being printed with a matrix of dots. The side of the film—which is generally a self-adhering film known as static transparent self cling film, which may be of polyvinyl chloride—which is without printing is the side that will be applied to the glass. Of course, adhesively applied film can also be used.

In the darker parts of the strip, the dots may be clear areas in a printed background, whilst in the lighter parts of the strip the dots are pinted on to a clear background. Such a strip may be prepared by a half-tone printing process, and the strip may in any event be screen printed.

If a printing ink coloured other than black is used, it is preferred the ink is translucent. However, when using black ink, opaque ink is better. Opaque black ink reduces glare, and it is preferred that a mixture of matt and gloss black inks is used, say 70 to 90% matt—the function of the gloss ink being to increase the durability of the printing. When printing with colour other than black, a translucent ink does not scatter the light, although the density of colour reduces the light intensity.

Other inks that can be used include metallic and fluorescent inks as well as reflective ink which is to say ink containing microbeads of glass which are totally internally reflective.

The strip can be printed also with a name, slogan, logo or the like, and this may be done in reverse before the strip is overprinted with a graduated dot pattern.

Photochromic and/or polarised strips can also be prepared.

The invention will be further apparent from the following description with reference to the figures of the accompanying drawing, which show, by way of example only, one form of strip embodying the invention.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
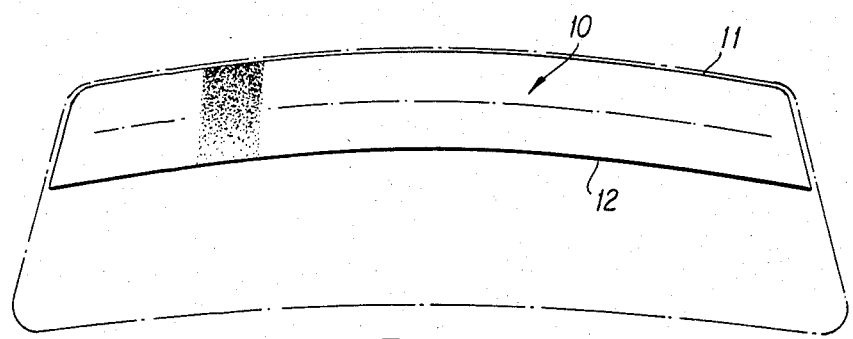
FIG. 1 shows a rear elevation of the strip in position on a windscreen.

Referring now to the drawing, it will be seen that the device comprises a strip 10 of so-called cling-film having a depth of 10.5 cms or thereabouts and a length sufficient to enable it to extend along the whole of the upper edge of a windscreen, for example, of a motor vehicle, to which it is to be applied.

The strip 10 is of clear material which has been over-printed with a dot matrix pattern with a coloured ink, which may be either transparent or opaque, as desired, to have a degree of transparency which increases gradually from its upper edge 11 to its lower edge 12.

Figure 2:
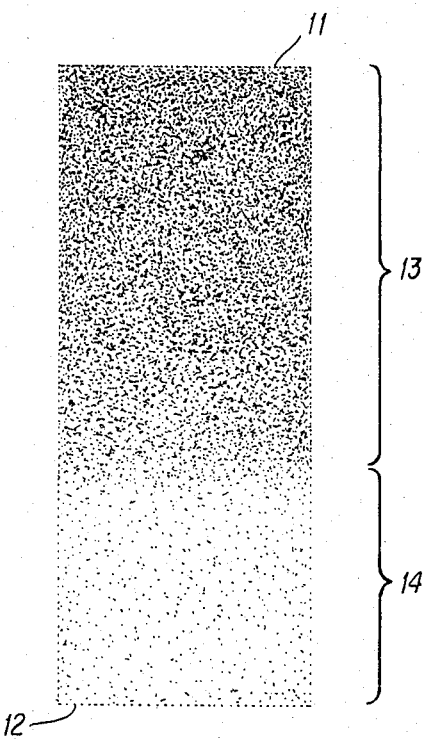
FIG. 2 shows a small section of the strip of FIG. 1 on an enlarged scale.

As best seen from FIG. 2, the pattern can be divided into two zones. In the upper zone 13, the dots are clear areas in an otherwise over-printed background, the sizes of the dots increasing from the upper to lower edges of the zone. In the lower zone 14, the dots are printed onto an otherwise clear background, the sizes of the dots decreasing from the upper edge of the zone to the lower edge thereof.

One possible method of making the strip 10 will now be described.

First, a board having a size and shape corresponding with the strip to be produced is sprayed with paint using an air brush to have the desired graduation of tone from its upper to lower edges. This is then translated into a photographic positive image of the corresponding dot matrix pattern by known techniques. Such a known technique is half-tone printing where a photographic image is prepared using a half-tone filter. According to standard approved half-tone techniques, the dot matrix will then be aligned at 45° to the edges of the strip. From this positive image a silk screen is prepared which is then used to overprint strips of windscreen cling-film to form the finished product.

When the strip 10 is applied to a windscreen it forms an excellent anti-glare device closely simulating the self-tinted strips of the more expensive types of windscreen, and does not present an abrupt transition between the part of the windscreen covered by the strip and the part not so covered.

It is preferred that such transition as there is will be in the lowermost part of the strip, in order that the greater part of the strip is useful against glare.

It may be arranged, by for example, using a scanning machine for page make-up in the photo-litho trade, that the density of the printing as well as other parameters thereof can be precisely specified, and this may in some circumstances be preferred to air brush techniques.

It will be appreciated that it is not intended to limit the invention to the above example only, many variations being possible, such as might readily occur to one skilled in the art without departing from the scope thereof.

Different types of ink, as described above, including black in mixtures of matt and gloss, transparent coloured inks, fluorescent, metallic and reflective inks can be used, and the strips can be made photochromic and/or polarised. Moreover, a name, slogan, logo or the like can be incorporated by printing in reverse and overprinting for the density graduation effect.

It is also possible, of course, to print two or more different colours of ink (one of which may be black) and by aligning the half-tone print dot pattern to produce multi-colour pattern effects from the Moiré effects. For example, a plaid or tartan effect can be produced using only two colours.

I claim:

1. An anti-glare accessory for application to an upper edge of a surface of a windscreen of an automobile, said accessory comprising:
   a strip of clear plastic film shaped to conform to said upper edge of said surface of said windscreen;
   opacifying means associated with said strip of plastic film, said opacifying means comprising a graduated matrix of dots providing said strip of plastic film with a gradually increasing degree of transparency in a direction extending from an upper edge of said strip of plastic film to a lower edge of said strip of plastic film; and
   means for adhering said strip of plastic film to a surface of the windscreen of an automobile.

2. The anti-glare accessory of claim 1 wherein said opacifying means is arranged to provide said strip with a constant degree of transparency in a direction transverse to said direction extending from said upper edge to said lower edge.

3. An accessory according to claim 1 wherein in darker parts of said strip the dots are clear areas in a printed background whereas in lighter parts of said strip the dots are printed on to a clear background.

4. An accessory according to claim 1 or claim 3, wherein said strip is prepared by use of a half-tone printing process.

5. An accessory according to any one of claims 1 or 3, wherein said strip is screen printed.

6. An accessory according to any one of claims 1 or 3, wherein said strip is prepared by printing on to said film an ink colored othr than black, said ink being translucent.

7. An accessory according to any one of claims 1 or 3, wherein said strip is prepared by printing a black ink on to the film, said ink being opaque.

8. An accessory according to claim 7 wherein said black ink comprises a mixture of matt and gloss inks.

9. An accessory according to claim 8 wherein said black ink comprises between 70 and 90% matt ink.

10. An accessory according to claim 5, wherein said strip is prepared by printing a metallic ink on to said screen.

11. An accessory according to any one of claims 1 or 3, wherein said strip is printed with fluorescent ink.

12. An accessory according to any one of claims 1 or 3, wherein said strip is printed with a reflective ink.

13. An accessory according to any one of claims 1 or 3, wherein said strip bears one of a name, slogan and logo.

14. An accessory according to claim 13 wherein said one of a name, slogan, and logo is printed in reverse.

15. An accessory according to claim 14 wherein the thus printed strip is overprinted with a graduated dot pattern.

16. An accessory according to any one of claims 1 or 3 wherein said strip is photochromic.

17. An accessory according to any one of claims 1 or 3 wherein said strip is polarised.

18. An accessory according to any one of claims 1 or 3 wherein said strip is produced by half-tone printing in at least two colors to create pattern effects by adjusting the alignment of the half-tone dot pattern.

19. The accessory of claim 18 wherein said means for adhering comprises static self-cling properties of said plastic film.

20. The accessory of claim 18 wherein said means for adhering comprises an adhesive.

* * * * *